United States Patent [19]

Peacock

[11] Patent Number: 4,893,328

[45] Date of Patent: Jan. 9, 1990

[54] AUTOMATED TELEPHONE OPERATOR OVERFLOW DEVICE

[75] Inventor: Gregory Peacock, Laguna Beach, Calif.

[73] Assignee: Microvoice Systems Corporation, Irvine, Calif.

[21] Appl. No.: 80,679

[22] Filed: Jul. 31, 1987

[51] Int. Cl.⁴ .............................................. H04M 3/50
[52] U.S. Cl. .................................... 379/67; 379/88; 379/210; 379/214; 379/265
[58] Field of Search ............... 379/67, 88, 84, 210, 379/213, 214, 233, 265, 266, 309

[56] References Cited

U.S. PATENT DOCUMENTS

| | | | |
|---|---|---|---|
| 3,542,961 | 11/1970 | Klein et al. | 379/207 |
| 3,965,306 | 6/1976 | Watkins | 379/211 |
| 4,125,748 | 11/1978 | Nahabedian et al. | 379/158 |
| 4,256,928 | 3/1981 | Lesea et al. | 379/214 |
| 4,328,396 | 5/1982 | Theis | 379/71 |
| 4,400,587 | 8/1983 | Taylor et al. | 379/113 |
| 4,401,856 | 8/1983 | Curtin et al. | 379/214 |
| 4,408,100 | 10/1983 | Pritz et al. | 379/67 |
| 4,413,158 | 4/1986 | Danford | 379/211 |
| 4,580,259 | 4/1986 | Harada et al. | 379/268 |
| 4,582,957 | 4/1986 | Hayes et al. | 379/74 |
| 4,696,028 | 9/1987 | Morganstein et al. | 379/88 |

FOREIGN PATENT DOCUMENTS 0193162 11/1982 Japan ................................ 379/244

Primary Examiner—Thomas W. Brown
Attorney, Agent, or Firm—Lyon & Lyon

[57] ABSTRACT

An automated telephone answering device is provided in a telephone answering system with a human operator, for automatic routing of incoming calls when the human operator is overloaded. The automated telephone answering device measures the service level being routed by the human operator, and when that service level exceeds a parameter which indicates that the human operator is overloaded and cannot reasonably service further incoming calls, an automatic routing device is enabled to automatically rout some incoming calls to their destinations. The automatic routing device receives incoming codes from an incoming caller and processses these codes to specify a destination.

9 Claims, 2 Drawing Sheets

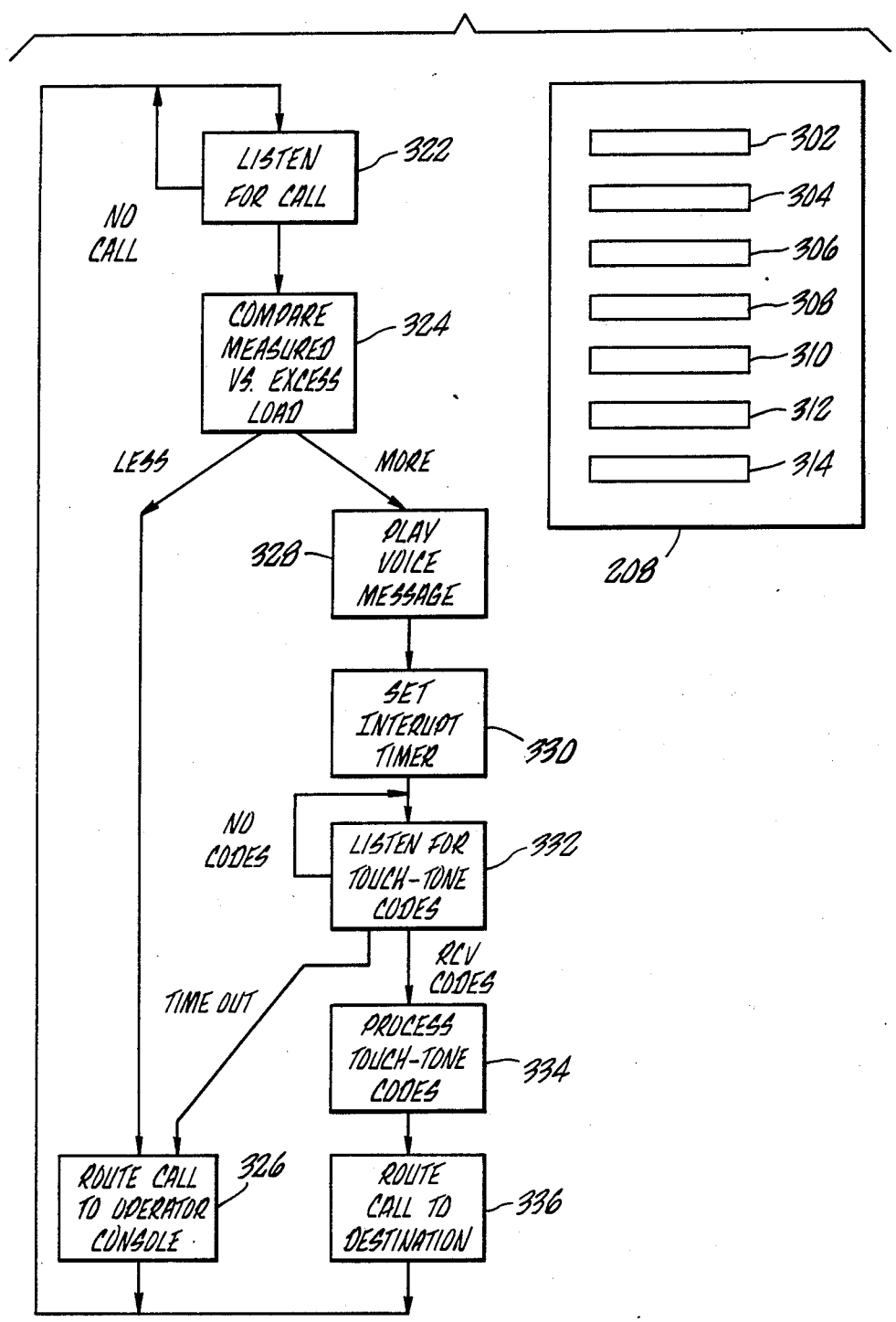

AUTOMATED TELEPHONE OPERATOR OVERFLOW DEVICE

BACKGROUND OF THE INVENTION

1. Field of the Invention

This invention relates to the field of automated telephone answering and forwarding.

2. Description of Related Art

Some organizations, due in part to their size, have a large number of telephone extensions which may be connected to the telephone network. It is generally desirable to allow incoming telephone calls to be connected to any of these extensions, but exigencies of cost and simplicity may require that all incoming calls be routed through a small number of routing points. These routing points may be serviced by a small number of human telephone operators, who manually forward calls to their intended destination extensions.

One problem which has arisen with manual forwarding of incoming calls is that human operators can become overworked during periods of intense activity, and may fail to service some calls before the incoming callers become frustrated and hang up. A device to automatically service incoming calls would not have this problem, but would instead be unresponsive to incoming callers who require service by a human operator. Servicing all incoming callers by machine may also be annoying to callers in some business contexts.

Devices which automatically service incoming calls and forward them to their intended destination extensions or recorded voice messages are well-known in the art. In particular, it is well-known to answer an incoming call and to route the call to an extension based on an extension number or menu selection typed in from a tone dial telephone. In general, two types of devices exist: (1) those which are set to service the incoming call immediately, requiring a caller without a tone dial telephone to wait a period of time before his or her call is serviced by a human operator, and (2) those which are set to service the incoming call only after a specified period of time, or number of rings, has elapsed and a human operator has not responded.

While these related devices are capable of automatic servicing and routing of incoming calls, they have the drawback that they cause difficulty for incoming callers. In case (1) above, an incoming caller without a tone dial telephone must wait an excessive period of time to reach a human operator, while in case (2) above, an incoming caller must wait an excessive period of time before his or her call is automatically routed. There is a need for an automated telephone operator backup device which generally allows incoming callers immediate access to a human operator, but which services incoming calls automatically when immediate access to a human operator is not possible.

Accordingly, it is an object of the invention to provide an automated telephone operator overflow device which generally allows incoming callers immediate access to a human operator, but which services incoming calls automatically when human operators are too busy. This object, and other and further objects of the invention, will be apparent after examination of the specification, the drawings, and the claims herein.

SUMMARY OF THE INVENTION

An automated telephone answering device is provided in a telephone answering system with a human operator, for automatic routing of incoming calls when the human operator is overloaded. The automated telephone answering device (or the telephone switch itself) measures the service load being routed by the human operator, and when that service load exceeds a parameter which indicates that the human operator is overloaded and cannot reasonably service further incoming calls, an automatic routing device is enabled to automatically route some incoming calls to their destination extensions, recorded voice messages, or destination voice mail or voice response systems. The automated operator may also be adapted to answer incoming calls which activate a common incoming call alerting device, in lieu of a person who is present and would answer such calls by dialing a predetermined answer code.

BRIEF DESCRIPTION OF THE DRAWINGS

FIG. 3a shows a flow chart of a routing method of the automated operator in a system embodying the present invention.

FIG. 3b shows registers related to the flow chart of FIG. 3a.

DESCRIPTION OF THE PREFERRED EMBODIMENT

Figure 1:
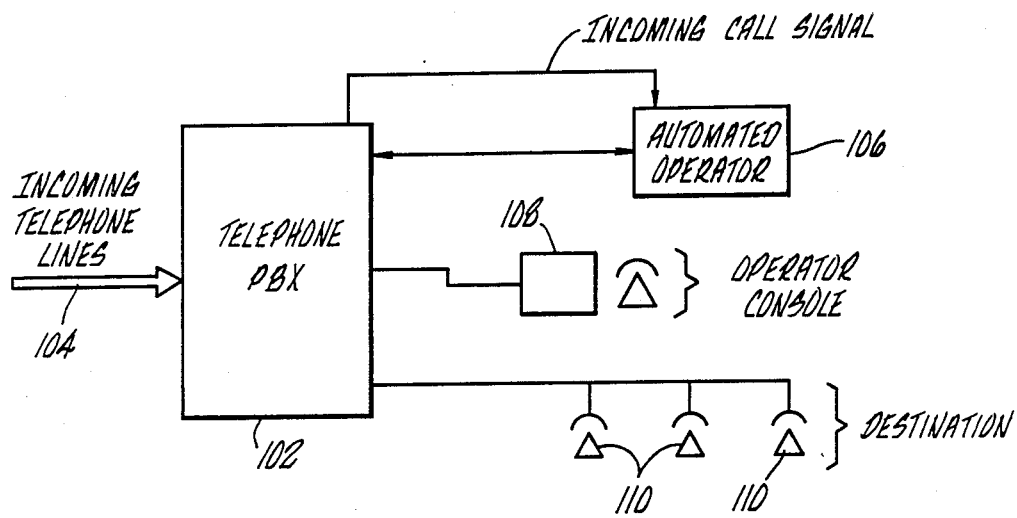
FIG. 1 is a block diagram of a system embodying the present invention.

FIG. 1 is a block diagram of a system embodying the present invention. A telephone PBX 102 receives incoming calls from a set of incoming telephone lines 104. The PBX 102 routes the calls to an automated operator 106, which re-directs the calls (via the PBX 102) either to an operator console 108 or to one of a set of destinations 110. A destination 110 may comprise a destination extension, a recorded voice message, a voice mail system, or a voice response system and may be internal to the automated operator 106. The operator console 108 may comprise a plurality of operator extensions for use by human operators. The automated operator 106 decides to re-direct calls to the operator console 108 so long as the measured service load on the human operator at that operator console 108 is less than an amount the human operator is reasonably able to handle (e.g. three calls in a twenty second time period). Alternatively, the automated operator 106 may be directed, by commands entered by an external switch or dialed-in code, to answer calls immediately (e.g., if the operator console 108 is unmanned or undermanned). When the measured service load exceeds the amount that the human operator is reasonably able to handle, the automated operator 106 processes the call itself, listening for tones on the incoming telephone line 104 and forwarding the call to a destination 110 as specified by those tones.

Figure 2:
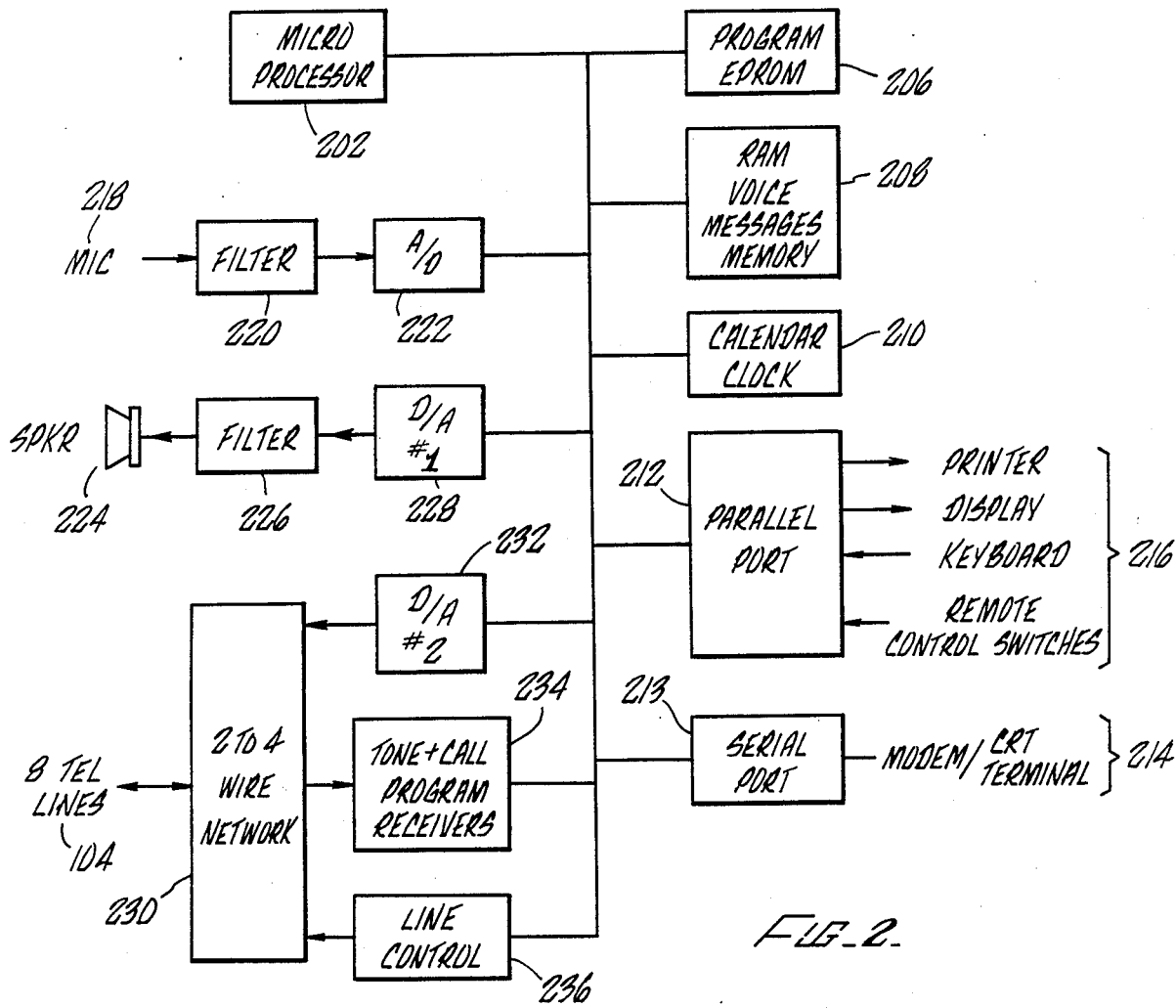
FIG. 2 is a block diagram of an automated operator in a system embodying the present invention.

FIG. 2 is a block diagram of an automated operator 106 in a system embodying the present invention. A microprocessor 202, logically connected to a microprocessor bus 204, operates under software control, reading software instructions from a program EPROM 206 and storing intermediate results in RAM 208, as is well-known in the art. A calendar/clock 210, also logically connected to the bus 204, awaits date/time requests on the bus 204 and responds by supplying a current date/time, as is well-known in the art. A parallel port 212, a serial port 213, also logically connected to the bus 204, are logically connected to, and provide access by the microprocessor to, user input devices 214 (such as a keyboard or control switches), user input/output devices 215 (such as a video display terminal) and to user output devices 216 (such as a hardcopy printer), as is well-known in the art.

During operation of the automated operator 106, the microprocessor 202 may read commands and instructions from a human controller via user input devices 214 or 215 and present command responses and status information to the controller via user output devices 215 or 216. Commands available to the controller may include commands to read and/or reset the calendar/clock 210, to examine and/or alter data stored in RAM 208, and to examine and/or alter the operating parameters of the automated operator 106. Implementation of such commands would be quite clear to one of ordinary skill in the art, and so is not generally addressed herein.

A microphone 218 is electrically connected via a mike filter 220 to an analog-to-digital converter ("A/D") 222, and a speaker 224 is electrically connected via a speaker filter 226 to a first digital-to-analog converter ("D/A") 228, as is well-known in the art. Incoming telephone lines 104 are electrically connected, as is well-known in the art, to a two-to-four wire network 230, which is itself electrically connected to a second D/A 232, a set of tone dial and call progress receivers 234, and a set of line controllers 236.

During operation of the automated operator 106, the microprocessor 202 may read voice messages from the microphone 218 and store them (after appropriate digitization via the A/D 222) in RAM 208. The microprocessor may also read voice messages from RAM 208 and output them (after appropriate conversion via the first D/A 228) to the speaker 224, or it may output them (after appropriate conversion via the second D/A 232) to an incoming telephone line 104, as is well-known in the art. Thus, voice messages may be stored in RAM 208 and replayed to callers at appropriate times.

Similarly, microprocessor 202 may read tone codes from an incoming telephone line 104 and store them (after receipt and processing by one of the set of touch-tone receivers 234) in RAM 208. The microprocessor 202 may also route a call on an incoming telephone line 104 by use of one of the set of line controllers 236, as is well-known in the art, either to an operator console 108 or to a destination 110. Thus, callers on incoming telephone lines 104 may specify destinations 110 with tone dial codes, and the microprocessor 202 may route their calls to their destinations 110.

Microprocessor 202 may also accept commands, entered by an external switch or by a dialed-in code, to answer calls immediately rather than only when the service load exceeds an amount the human operator is reasonably able to handle. This may be particularly advantageous during night operation or when the operator console 108 is unmanned or undermanned.

Some telephone switches are adapted to operation in which a common incoming call indicator, such as a night bell or common ring circuit, is signalled whenever an incoming call is detected. When an incoming call indicator is signalled, a person who is present may choose to receive the call by dialing a predetermined answer code. The automated operator 106 may be adapted to answer such incoming calls, in lieu of a person who is present.

Parallel port 212 may be scanned periodically by microprocessor 202 for remote input. When microprocessor 202 detects an incoming call indicator on parallel port 212, it seizes an available telephone line and dials the predetermined answer code. The telephone switch then routes the incoming call to the automated operator 106. Microprocessor 202 places the automated operator 106 in a call processing state equivalent to receiving an incoming call (state 326, further disclosed with reference to FIG. 3a), in which state a message is played to the incoming caller and the incoming call is routed to a destination 110.

FIG. 3a shows a flow chart of a routing method of the automated operator 106 in a system embodying the present invention, FIG. 3b shows registers related to the flow chart of FIG. 3a. Reference is also made to FIGS. 1-2, which show elements which perform the steps disclosed herein. Calls on incoming telephone lines 104 are routed to the operator console 108 so long as measured service load on the human operator at that operator console 108 is less than a selected amount the human operator is reasonably able to handle. When this threshold is exceeded, the automated operator 106 replays a voice message from RAM 208 to instruct the caller to designate a destination 110, listens on the incoming line 104 for tone dial codes, and routes the call to a destination 110 designated by the tone dial codes. If no tone dial codes are entered by the caller, the automated operator 106 routes the call to the operator console 108 in spite of the excess load.

During operation of the routing method of FIG. 3a, the microprocessor 202 makes use of several registers in RAM 208, shown in FIG. 3b, including registers for storing a measured service load 302, an excess load threshold 304, a no-tone interrupt timer 306, a set of input tone codes 308, a first load parameter 310, a second load parameter 312, a set of timer registers 314.

Therefore, at step 322, the automated operator 106 listens for a call on the set of incoming telephone lines 104. If no incoming call exists, control is transferred back to step 322 to form a listening loop, else control continues with step 324. At step 324, the automated operator 106 compares the measured service load 302 against an excess load 304. If measured service load 302 is less than excess load 304, control continues with step 326, else control continues with step 328.

Measured service load 302 is calculated by recording the number of incoming calls (measured by a first load parameter 310) which have been routed to the operator console 108 within a recent period of time (measured by a second load parameter 312). Each incoming call which is routed to the operator console 108 is assigned a timer register 314, which counts the age of that incoming call. Incoming calls are detected by noting the first ring on the incoming telephone line 104; at the end of the first ring the automated operator 106 starts to time the call. Timing for each incoming call is discontinued when that incoming call ages past the recent period of time. The use of timer registers to measure time which has passed since a known event is well known in the art and thus is not further detailed herein.

In a preferred embodiment of the invention, it may be presumed, for example, that a human operator can handle up to three calls in a twenty second time period, so the first load parameter 310 may be set to three calls and the second load parameter 312 may be set to twenty seconds. The first load parameter 310 and the second load parameter 312 are operating parameters for the automated operator 106, and may be examined and/or altered by a human controller via user input device 214 or 215. Measured service load 302 may be periodically calculated by the automated operator 106. Other methods of calculating measured service load 302 are of course still within the scope of the present invention.

At step 326 (measured service load 302 less than excess load 304) the call is routed to the operator console 108, and control continues with step 322 to re-enter the listening loop. At step 328 (measured service load 302 greater than or equal to excess load 304) the automated operator 106 replays a voice message from RAM 208 to instruct the caller to designate a destination 110, and control continues with step 330.

At step 330, the automated operator 106 sets the no-tone interrupt timer 306 and control continues with step 332. At step 332, the automated operator 106 listens on the incoming line 104 for touch-tone codes. If no touch-tone codes exist, control is transferred back to step 332 to form a listening loop, else control continues with step 334. However, if the no-tone interrupt timer 306 is triggered, control continues with step 326 (to route the call to the operator console 108).

At step 334, the automated operator 106 clears the no-tone interrupt timer 306, processes the tone codes, and stores them as input tone codes 308; control continues with step 336. At step 336, the automated operator 106 routes the call to a destination 110 designated by the input tone codes 308. Control then continues with step 322 to form a listening loop.

No termination point is shown for the routing method of FIG. 3b because it is expected that the automated operator 106 will continue its operation indefinitely. As noted above, a human controller may enter commands and instructions via user input device 214 or 215 to direct the automated operator 106 to start or to cease its operation.

While a presently preferred embodiment has been disclosed herein, many variations are possible which remain within the scope of the invention.

I claim:

1. In a telephone answering system having a plurality of destinations and at least one routing point for arrival of incoming calls, an automated telephone answering device, comprising
   measurement means for measuring the number of incoming calls for a recent period of time of predetermined length;
   automated routing means for routing incoming calls to their destinations; and
   means, responsive to said measurement means, for engaging said automated routing means when said number of incoming calls for said recent period of time exceeds a predetermined value.

2. An automated telephone answering device as claimed in claim 1, wherein said automated routing means comprises
   means for receiving a signal for an incoming call, said signal indicating a destination for said incoming call; and
   means for routing said incoming call to said destination without human operator intervention.

3. In a telephone answering system having a plurality of destinations and at least one routing point for arrival of incoming calls, a method of routing said incoming calls, comprising the steps of
   receiving said incoming calls;
   measuring a number of incoming calls for a recent period of time of predetermined length;
   immediately routing subsequent incoming calls by an automated routing device whenever the number of incoming calls for said recent period of time exceeds a predetermined value; and
   allowing incoming calls to instead be routed by a human operator so long as said number of incoming calls for said recent period of time does not exceed said predetermined value.

4. In a telephone answering system having a plurality of destinations, at least one routing point for arrival of incoming calls, an automated operator, comprising
   a common incoming call indicator, not associated with a particular extension, for indicating to persons that a call is coming in which can be answered by said persons by dialing a predetermined answer code;
   automated routing means for routing incoming calls to their destinations; and
   means responsive to entering said predetermined answer code to direct said routing point to route an incoming call to said automated operator.

5. In a telephone answering system having a plurality of destinations, at least one routing point for arrival of incoming calls, and a common incoming call indicator, not associated with a particular extension, for indicating to persons that a call is coming in which can be answered by said persons by dialing a predetermined answer code, a method of operating an automated operator in conjunction with said routing point, comprising the steps of
   detecting signalling of common incoming call indicator;
   seizing a telephone extension; and
   entering a predetermined answer code via said seized extension to direct said routing point to route an incoming call to said automated operator.

6. A device as in claim 1, wherein said means for engaging operates, if at all, immediately after an incoming call is detected.

7. In a telephone answering system having a plurality of destinations and at least one routing point for arrival of incoming calls, an automated telephone answering device, comprising
   means for routing an incoming call to a predetermined destination;
   means for measuring the number of incoming calls for a recent period of time of predetermined length;
   means, responsive to said means for measuring, for rerouting an incoming call from said predetermined destination to a live operator so long as said number of incoming calls is less than a predetermined value.

8. An automated telephone answering device as in claim 7, wherein said predetermined destination comprises means for routing incoming calls to their destinations without live operator assistance.

9. In a telephone answering system having a plurality of destinations, at least one routing point for arrival of incoming calls, and an operator console, an automated telephone answering device, comprising
   a communication bus;
   line controller means, connected to said bus, and connected to said routing point, for controlling the operation of said routing point;
   tone receiver means connected to said bus, for receiving routing information for said incoming calls;

first memory means, connected to said bus, for storing voice messages for prompting said routing information;

second memory means for storing software programs;

a micro-processor connected to said bus, operating under control of said software programs, for counting the number of said incoming calls in a recent period of time of predetermined length and for controlling said line controller means; wherein said line controller means (i) routes calls to said operator console so long as said number of incoming calls is not greater than a predetermined value, and wherein said line controller means (ii) plays one of said voice messages on at least one of said incoming calls, receives routing information from said tone receiver means, and routes said at least one incoming call to one of said plurality of destinations, so long as said number of incoming calls is greater than a predetermined value; and whereby said number of incoming calls is counted by said microprocessor without regard to whether any previous calls remain in said system and without regard to whether any of said incoming calls are delayed.

* * * * *